UNITED STATES PATENT OFFICE.

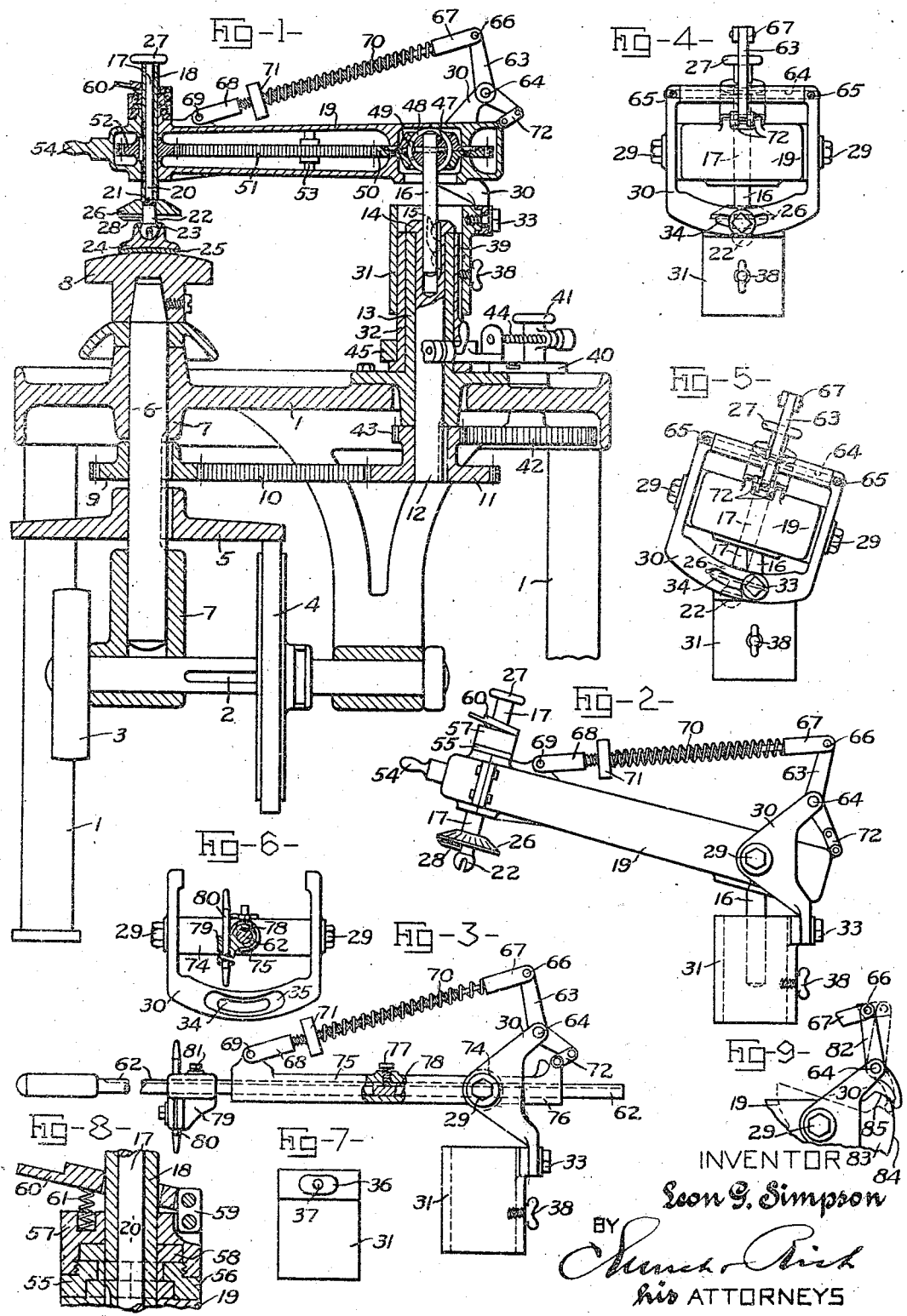

LEON G. SIMPSON, OF ROCHESTER, NEW YORK, ASSIGNOR TO BAUSCH & LOMB OPTICAL COMPANY, OF ROCHESTER, NEW YORK, A CORPORATION OF NEW YORK.

LENS-GRINDING MACHINE.

1,272,546.     Specification of Letters Patent.     Patented July 16, 1918.

Application filed March 6, 1917. Serial No. 152,516.

*To all whom it may concern:*

Be it known that I, LEON G. SIMPSON, a citizen of the United States, residing at Rochester, in the county of Monroe, State of New York, have invented certain new and useful Improvements in Lens-Grinding Machines; and I do declare the following to be a full, clear, and exact description of the same, reference being had to the accompanying drawings, forming a part of this specification, and to the characters of reference marked thereon.

When grinding curved lens surfaces in a machine having a lens carrier spindle arranged axially parallel to the axis of rotation of the grinding lap spindle, the axis of rotation of the lens carrier relatively to the axis of its spindle is more or less oblique according to the strength of the curvature of the grinding lap when the lens carrier spindle is shifted or set to one side of the axis of rotation of the grinding lap. This causes excessive wear of the lens carrier end of the spindle and of the opposed lens carrier socket due to the relative angularity of the axes of rotation of the spindle and lens carrier, and also may deform the surface being ground owing to the center of pressure of the lens carrier spindle being eccentric to the center of rotation of the surface being ground and the direction of spindle pressure being inclined to a line normal to the curvature of the lap. These disadvantages may be minimized by setting the axis of the lens carrier spindle parallel to a radial line normal to the curvature of the abrading lap at a point on the path of traversal of the axis of the lens carrier across the lap and midway between the adjacent and remote limits of the traversing movement of said axis while the lens carrier spindle is operatively related to the lap.

This will greatly reduce the relative angularity of the rotative axis of the lens carrier spindle and the axis of rotation of the lens carrier, and said disadvantages may be further minimized by so supporting the spindle that its movements toward and away from the grinding lap will be substantially parallel to its axis, and thus the center of pressure applied through the lens carrier spindle to the lens carrier to urge it and its lens against the grinding lap when the lens carrier is in contacting relation with the lap will be substantially coincident with the carrier's axis of rotation, all the components of pressure being either normal to the surface embraced, or balanced by similar components having an opposite direction and the axis of the lens carrier spindle will extend in the direction of the resultant pressure.

It is one object of this invention to provide a lens grinding machine, which in operation obviates or minimizes the above named disadvantages.

Another object is to provide a machine for grinding astigmatic lenses such as toric, cylinder or prismatic lenses, embodying a lens carrier driving spindle that is positively rotated in time with the lap at the same speed and in the same direction, wherein the axis of rotation of the lens carrier spindle may be set at various angles to the axis of rotation of the grinding lap thereby minimizing the angularity of the axis of rotation of the lens carrier relatively to its spindle and as one consequence materially reducing the wear on the universal connection between the lens carrier and the lens carrier socket.

Another object is to provide a rotatable lens carrier spindle to which may be readily attached or in which may readily be adjusted, any one of a number of interchangeable universal driving members adapted to coöperate with the socket of the lens carrier.

Another object of the invention is to provide means for quickly and independently adjusting the rotatable lens carrier spindle endwise or axially in its supporting arm.

Another object of the invention is to provide improved means for automatically holding the lens carrier in engagement with the lap under any desired degree of pressure during grinding of the lenses, and for automatically holding the lens carrier spindle raised from the lap which is desirable to facilitate removal of the carrier for inspection of the lens being ground or polished or for substitution of other grinding implements.

Still another object is to provide a machine that is readily convertible from a machine especially adapted for grinding astigmatic lenses to a machine equally well adapted for grinding spherical lenses or vice versa, at the will of the operator.

In the drawings: Figure 1 is a vertical sectional side elevation of the improved lens grinding machine as arranged for automatically grinding astigmatic lenses. Fig. 2 is a side elevation of the detachable astigmatic lens grinding arm. Fig. 3 is a side view of the detachable spherical lens grinding arm. Figs. 4 and 5 are rear elevations of the astigmatic lens grinding arm, as seen from the right hand of Fig. 2, adjusted in two different relative positions. Fig. 6 is a front sectional elevation in the plane of the lens carrier spindle, of the spherical lens grinding arm shown in Fig. 3, and the supporting yoke adapted to both grinding arms, the means for pressing the lens carrier toward the lap, and for holding the arm elevated being omitted. Fig. 7 is a rear elevation of the sleeve which carries the arm yoke and arm. Fig. 8 is an enlarged detail vertical section of the lens carrier spindle and sleeve and thrust bearing and clamp. Fig. 9 is a detail of a modification of the device for depressing the lens carrier arm and for holding it elevated.

In pendent brackets on any suitable frame or support 1, is journaled a main power shaft 2 driven by a belt on a pulley 3 and carrying a driving disk 4 which has a feather movable along a spline in the shaft and frictionally rotates at any desired speed a wheel 5 which is fast on a vertical spindle 6 journaled in bearings 7 on the frame and having a tapering upper end which carries the removable grinding shell or lap 8. A sprocket wheel 9 fixed to the spindle 6 operates a silent chain 10 thereby transmitting power to a sprocket wheel 11 keyed to the lower end of a vertical countershaft 12 journaled in a post 13 fixed at its flange to the frame 1. The shaft 12 has a flange 14, bearing on the top of the post 13. The shaft 12 is provided at its upper end with a concentric splined bore the spline of which is engaged by keys 15 set in a sprocket spindle 16 fitting detachably in the bore of shaft 12, by which it is driven to rotate the lens carrier above the lap by means of interposed driving gearing hereinafter described.

The lens carrier spindle generally marked 17, is specially formed with a sleeve 18, journaled in the outer end of a preferably hollow pivoted arm 19, and a draw rod 20 is adjustable in the sleeve and has at its lower end a thread 21 screwing into the upwardly tapering shank of the renewable lens carrier coupling portion 22 of the spindle which is shown formed with an open lateral slot receiving a pin 23 fixed across a top socket of a lens or work carrier 24, to provide a separable universal joint between the spindle and the lens carrier. To this carrier 24 is cemented a lens blank 25 to be ground or polished on the lap 8. The sleeve 18 fixedly carries a disk scale 26 into a tapered recess of which the tapering shank of the spindle coupling 22 is tightly drawn as the threaded rod 20 is manually turned by manipulating its head 27. The graduations of the spindle scale 26 are readable relatively to an index finger 28 projecting laterally from the detachable end coupling 22 of the spindle. After loosening the rod 20 at its thread 21 the spindle coupling 22 and its index 28 may be turned relatively to the scale 26 and be reset as desired by again tightly screwing the rod into the coupling. This construction also allows ready renewal of a worn coupling portion 22 of the spindle. All the parts 18, 20, 22, 26, 28, thus rotate in unison, and the lap spindle 6 and the lens carrier spindle 17 rotate at the same speed and in the same direction.

The lap spindle 6 and the lens carrier spindle 17 may be relatively arranged in any manner adapting them to be set to rotate the two spindles in relatively inclined planes, and to this end the rotative axis of either spindle may be inclined relatively to the rotative axis of the other spindle. It now is preferred to hold the lap spindle 6 for rotation with its axis in a vertical plane and to adapt the lens carrier spindle 17 for adjustment to set its axis obliquely in any desired plane inclined to either the right or left hand of the axis of the lap spindle 6. To assure this oblique lateral adjustment of the lens carrier spindle while permitting its vertical movement away from the lap 8, the arm 19 is trunnioned on the trunnion studs 29 in a yoke 30 carried by a sleeve 31 fitted for vertical adjustment either directly on the post 13, or on a sleeve 32 journaled on this post. The trunnion axis about which the arm 19 is vertically movable intersects at right angles the axis of the shaft 16 which is coincident with the axis about which the arm swings laterally, that is, the axis of the post 13, and is also the axis about which the universal angle gear within the arm 19 rotates. A clamping screw 33 passing through a curved slot 34 in the yoke 30 secures this yoke and the arm 19 at any desired oblique adjustment.

In order that the angle gearing between the shaft 16 and the sprocket 52 may be able to rotate freely when the arm is tilted laterally in a plane intersecting the trunnion axis and the axis of the shaft 16, it is necessary that the trunnion axis be tilted about an axis passing through the intersection of the trunnion axis with the shaft 16 and therefore the yoke is constrained to be adjustable about an axis which we will term an axis of lateral tilt of the arm 19, which passes through this intersection and extends at once perpendicular to both the axis of the shaft 16 and the trunnion axis. This constrainment is effected by providing an arcuate segment 36 of a ring, arranged concentric with said axis of lateral tilt and protruding from a surface formed on the sleeve 31, said surface extending laterally in the direction of a plane perpendicular to the axis of lateral tilt, as well shown in Fig. 1, and by providing the yoke 30 with an arcuate lower portion having a recess 35 adapted to fit snugly over the segment 36. The plane of movement of the yoke and consequently the trunnions, is further constrained by the surface on the sleeve 31 from which the arcuate segment 36 protrudes, which coöperates with the adjacent face of the yoke 30 to hold the trunnion axis at all times in a plane passing through the axis of the shaft 16, the plane coöperating surfaces of the yoke 30 and the sleeve 31 being held in contact and these two members being clamped together when desired by a clamping screw 33 passing through the arcuate slot 34 and engaging with the threaded hole 37 in the arcuate segment 36.

As shown the sleeve 31 is detachably secured to the sleeve 32 by a set screw 38 entering a vertical slot 39 in the side wall of the sleeve 32, thus causing the sleeve 31 to oscillate horizontally with the sleeve 32 as the latter may be oscillated by an eccentric throw crank mechanism 40 of any approved type and as shown comprising an eccentrically adjustable crank pin 41 fixed to a plate rotated by a stub shaft journaled in the frame 1 and carrying a gear wheel 42 engaged by a gear wheel 43 rotated by the countershaft 12. The crank pin 41 is coupled by a screw 44 to a lug fixed to a split ring clamp 45 surrounding the sleeve 32 and having a clamping screw 46 for at will tightening the clamp on the sleeve 32 to at times laterally oscillate it and the sleeve 31 and the connected pivoted and trunnioned arm 19, to any extent determined by the eccentric adjustment of the crank pin 41.

Any approved universally acting driving gearing may be used on the detachable arm 19 which will assure rotation of the lens carrier spindle 17 from the countershaft 12 and spindle 16 at level, or laterally oblique, or upwardly inclined positions of the arm. One example of such gearing is sufficiently shown in Fig. 1, wherein a universal joint comprising a ball 47 pinned to the spindle 16 has a circumferential groove 48 receiving a key 49 swiveled to a sprocket wheel 50 from which a driving chain 51 passes to a sprocket wheel 52 having a key fitting a spline in the lens carrier spindle sleeve 18. An idler 53 maintains desirable tension of the driving chain 51, and the arm 19 may have a front handle 54 for manually elevating or depressing it on its trunnions 29. When the arm 19 is adjusted obliquely to either the right or left hand, or is elevated or depressed on its trunnions 29, the above named universal joint accommodates itself to the arm movements as the sprocket wheel 50 rocks on the ball 47 and the swivel pin of the key 49 turns in its seat in the wheel 50, and as the key slips around more or less in the ball groove 48 which may extend but partly around the ball instead of entirely around it as shown in Fig. 1 of the drawings.

It is desirable to provide for independent bodily vertical adjustment of the lens carrier spindle 17 in the arm 19, to accommodate the above named vertical adjustment of the arm and its supporting sleeve 31 on the sleeve 32. To do this in a preferred manner the front top portion of the arm 19 is circumferentially grooved and shouldered in the plane of the spindle 17 to accommodate a thrust collar 55, split diametrically into two halves, and having its upper part formed into an internally projecting annular tongue 56 fitting loosely between the walls of said groove which is formed beneath the flange 58 on the arm 19 as shown in Figs. 1 and 8. The periphery of the tongue 56 of the split collar is externally screw threaded and its two halves are held together intact, after insertion in the groove, by the collar 57 which is internally threaded to fit the thread of the split collar and raised to overlie the flange 58 formed on the arm 19. When the collar 57 is screwed down tightly upon the split collar 55 both collars are held against vertical movement but will turn freely on the arm 19 while the lens carrier 17 rotates in the arm. To the collar 57 is pivoted one end of a link 59 the other end of which is pivoted to a plate clamp 60 having a sharp edged slot or opening somewhat larger than the diameter of the lens carrier sleeve 18. In a recess of the collar 57 is held an expanding spring 61 which normally presses the clamp 60 into gripping engagement with the sleeve 18. When the clamp is depressed it will release the sleeve 18 and permit its quick manual movement in the arm 19 to hold the lens carrier spindle 17 at any desired vertical adjustment thereon.

Special automatic means are provided for pressing the lens to the grinding lap during automatic grinding of lenses when using either the arm 19 shown in Figs. 1 and 2, or when using the arm 62 shown in Fig. 3. The same means which automatically presses the lens to the lap are also available to hold either grinding arm tilted upward for keeping the lens carrier spindle clear above the lap to facilitate replacement or substitution of the work. Now referring more particularly to the automatic machine shown in Figs. 1, 2, 4, 5 of the drawings, it will be seen that an elbow lever 63 is fulcrumed on a rod 64 shown held by screws 65 in the upper ends of the opposite limbs of the yoke 30.

The upper longer limb of the lever 63 is connected by means of a yieldingly extensible telescoping thrust rod to a lug on the upper part of the arm 19 near its forward end. The thrust rod comprises a forked rod 67 having a shank telescoping within the screw threaded tubular shank of the forked rod 68 and is extended by means of the compression spring 70 surrounding the telescoping shank and bearing one end against the shoulder of the fork of the rod 67 and at the other end against the thrust collar 71 which is threaded on the screw threaded tubular shank of the rod 67 in order that it, the collar, may be run along this shank to increase or decrease the pressure effected by the spring 70. The fork 67 of the thrust rod is preferably hinged to the upper longer limb of the lever 63 through the pin 66 and the end 68 of the yielding extensible thrust rod is hinged by the pin 69 to an eye formed in the lug on the front upper end of the arm 19. The function of this thrust rod, the pressure of which is adjustable, is to urge the arm downward when the arm is in the position shown in Fig. 1 and thus create a grinding pressure between the lens being ground and its lap and when the arm is raised as shown in Fig. 2, to hold the locking linkage in the locked position.

The lower shorter limb of the lever 63 is pivoted to and between one end of each of two toggle links 72 the other ends of which are pivoted to lugs on the rear end of the arm 19 behind its trunnions 29. The fulcrum rod 64 of lever 63 preferably passes through long bosses 73 forming lateral extensions of the lever as more clearly shown in Figs. 4 and 5 of the drawings.

Referring now more particularly to Figs. 3 and 6 of the drawings, it will be seen that the spherical lens grinding arm 62 is fitted in a headblock 74 which is trunnioned for vertical oscillation on studs 29 entering opposite limbs of an obliquely adjustable yoke 30 held by a clamping screw 33 to a sleeve 31 which is adapted to be slipped over the above named sleeve 32 to which it may be clamped at any desired vertical adjustment by a screw 38 entering the slot 39 of sleeve 32. The trunnioned head 74 has a long front tubular extension 75 and a shorter rear tubular extension 76 through which extensions the arm 62 passes loosely and these parts 74, 75, 76, may be tightly and non-rotatably clamped to the arm 62 by a set screw 77 shown threaded into the head extension 75 and entering a lengthwise spline 78 in the arm. A spindle block 79 fixedly carrying a spindle 80 adapted to the socket of a lens carrier, is held non-rotatably upon the arm 62 by a set-screw 81 entering the arm spline 79. The spindle 80 may be vertically adjusted in the block 78 and both block and spindle may be adjusted and locked at any desired position on the arm 62, which itself is adjustable endwise in the trunnioned block 74 and its extensions 75, 76.

These extensions are provided in order to obtain proper points of attachment for the lever, extensible thrust rod, spring and toggle connections marked 63 to 72 and which are substantially similar in structure and operation to like numbered parts shown in Figs. 1 and 2 of the drawings. After loosening the screw 33 the lens grinding arm 62 with its supporting block 74 and yoke 30, the connections 63 to 72 and the spindle 80, may together be laterally adjusted obliquely on the yoke support 31 to which said adjusted parts may again be locked by the screw 33, to set the lens carrier spindle 80 at any desired angular relation to have the line of pressure of the spindle be normal to an element of the abrading surface, that is, normal to a line tangent to some selected point of the abrading surface of an opposed grinding lap, substantially as with the obliquely set arm 19 and its spindle shown in Fig. 5 of the drawings.

In view of the above detailed description of this machine a brief summary of its adjustments during various lens grinding operations will suffice. First considering the machine as adjusted in Fig. 1 for automatically grinding and polishing astigmatic lenses, the arm 19 and its supporting yoke 30 are fastened to the sleeve 31 by the bolt 33 at desired oblique adjustment, as shown for example in Fig. 5, said sleeve 31 also being adjusted on the sleeve 32 at proper height and locked by the set screw 38. While the arm 19 is elevated as shown in Fig. 2, the lens carrier spindle rod 20 may be loosened in the sleeve 18, by manually turning the rod head 27, and the spindle coupling 22 now may be turned in the scale 26 for properly setting or resetting the coupling index 28 to the scale, and the rod 20 then is reversely turned to draw the tapering shank of the coupling 22 tightly into the scale 26, and the sleeve 18 may be adjusted vertically while manipulating the clamp 60, to accommodate vertical adjustment of the sleeve 31 on the sleeve 32, as made necessary by the thickness of the lens blank and the height of the lap. The lever screw 46 in the split clamp lever 45 now is tightened to later assure lateral oscillation of the arm 19. After the lens carrier 24 is adjusted to the spindle coupling 22, the arm 19 is lowered to operative position shown in Fig. 1 and the machine is started and the arm 19 is then automatically pressed downward by the spring 70 to hold the lens 25 that is mounted on the now rotating and laterally oscillating carrier 24 to the rotating lap 8 with any necessary degree of pressure determined by the adjustment of the thrust collar 71 along the screw threaded shank of the thrust rod member 68, and while the lever 63 and rod 67 are locked against rearward movement by the upwardly inclined toggle links 72 to enable said parts 63, 67, to unyieldingly resist rearward thrust of the spring 70. The pressure of this spring may at any time be supplemented by downward manual pressure on the arm handle 54. As the lens carrier 24 is rotated by the spindle 17 in unison with the grinding lap 8, the arm 19 and the lens carrier are laterally oscillated about the post 13 to an extent determined by the degree of eccentric adjustment of the wrist 41 of the throw crank mechanism 40. Although a differential movement between the lens being ground and the lap 8 is thus produced the corresponding axes of the lens and lap are always kept parallel to one another and thus any lens having two dissimilar meridians may be ground with the machine set up as shown in Fig. 1.

Any time during the lens grinding process the arm 19, with its continuously running universal driving gearing may be manually tilted upward on the trunnions 29 to the position shown in Fig. 2, to allow removal and inspection of the lens, or for adjustment of other work on the spindle 17. As the arm 19 thus tilts to upper position the screw 68, the rod 67 and the spring 70 throw the lever 63 rearward on its fulcrum 64, thereby swinging the toggle links 72 to the forwardly inclined position of Fig. 2, where the links are stopped by striking the adjacent portion of the arm 19, when they resist further movement of the lever 63, and the pressure of the spring 70 now is availed of to assist in holding the parts 63, 72 thus adjusted to automatically lock the arm 19 raised until after it is next manually lowered to press a lens on the applied carrier 24 to the grinding lap 8, to be automatically held thereto by the spring 70, as hereinabove described.

To convert the wholly automatic astigmatic lens grinding machine to one adapted for grinding spherical lenses and employing a manually operative arm 62 shown in Fig. 3, it is only necessary to loosen or remove the set screw 38 holding the sleeve 31 to the sleeve 32 and lift off the sleeve 31 while a separable member of the driving mechanism interposed between the lap spindle 6 and the lens carrier spindle 17, and here shown as the spindle 16, withdraws from its coacting member here shown as the spindle 12. The duplicate sleeve 31 supporting the arm 62 will now be placed upon the sleeve post 32, and be fastened thereto by a set screw 38 entering its groove 39, thus providing for bodily vertical adjustment of the sleeve 31 and arm 62 to accommodate varying thicknesses of lenses and laps. The lens carrier being adjusted to the spindle 80 in the block 79, the arm 62 may be pressed downward manually as the block 74 turns on the trunnions 29, to hold the lens blank to a suitably formed rotating spherical lap substituted for the lap 8, for giving the surface of the lens blank the desired spherical form. After loosening the clamping screw 33, the yoke 30, the arm 62, and all connected parts 63, 70 to 72 and the block 79 may be set obliquely at any desired angle to either side to accommodate either concave or convex curves and right or left hand operators.

In the slight modification shown in Fig. 9 of the drawings, a somewhat differently formed rocking lever 82 is fulcrumed at 64 to the yoke 30 and is coupled at 66 to the rear end of the rod 67 which carries the compression spring 70 shown in Figs. 1, 2, 3. Fig. 9 and the modification shown therein will undoubtedly make more clear the function and operation of the linkage used in the preferred embodiment of the mechanism used for holding the lens being ground against the grinding lap and for locking the arm 19 or the arm shown in Fig. 3 in a raised position. The rear end 83 of the lens carrier arm 19 which is fulcrumed at 29 to the yoke 30 is here formed on a convex curve 84 struck on a radius from the axis of the arm trunnions 29, and above this curve 84 the arm has a communicating angular stop shoulder 85, said surfaces 84, 85 constituting a continuous cam coacting with the rounded lower end of the lever 82. When the lens carrier 19 is manually elevated at its front end on the trunnions 29, the spring thrust on the rod 67 carries the foot of the lever 82 inward upon the inclined surface 85 of the arm thereby holding the arm elevated as shown in dotted lines in Fig. 9, and by simply depressing the arm against the yielding resistance offered by the foot of the lever while on the cam surface 85, the lever rides from the surface 85 on to the curved cam surface 84 and the arm now may freely move vertically at its front end thus permitting the spring 70, acting between the upper end of the lever 82 and the front end of the lens carrier arm, to hold the lens to be ground or polished against the abrading surface of the lap under suitable pressure.

It is not essential to some features of this invention hereinafter claimed that this improved machine be organized to include all of the parts herein shown and described, as for instance, should means other than the adjustable throw crank 40 and the clamp 45 be used to impart lateral oscillation to the obliquely adjustable trunnioned arm 19, the sleeve 31 would be discarded and the yoke 30 would be attached directly to the other sleeve 32 that is journaled directly around the post bearing 13. Furthermore, the driving gearing interposed between the lap spindle 6 and the lens carrier spindle 17, may be variously formed and arranged, it being desirable however, that there be in said interposed gearing a member readily separable from and readjustable to its immediately coacting member or members to allow quick and convenient removal of the astigmatic lens grinding arm 19 having a rotating lens carrier spindle and driving mechanism therefor from a post or support upon which another support carrying a spherical lens grinding arm having a fixed lens carrier spindle 80 may be substituted.

Having thus described my invention, what I claim and desire to secure by Letters Patent of the United States is:

1. In a lens grinding machine, the combination of a rotatable spindle carrying a curved surface abrading lap, an arm overhanging the lap, a lens carrier spindle carried by the overhanging portion of the arm and having an end opposed to the lap surface, a support for the arm, means for constraining the lens carrier spindle to cause it when moved laterally to traverse the surface of the lap, an adjustment for tilting the lens carrier spindle in the plane of its traversal to set its axis normal to an eccentric element of the curvature of the lap surface lying in the path of the lens carrier spindle's traversal thereof, means for constraining the longitudinal movement of said lens carrier spindle to cause it to move axially in all of its settings whereby said lens carrier spindle may be normally incident upon any element of the curvature of the lap surface lying in the path of traversal of the lens carrier spindle to which element the axis of the spindle has been perpendicularly set, and means for applying the abrading pressure through the lens carrier spindle in the direction of its longitudinal axis.

2. In a lens grinding machine, the combination of a rotatable spindle carrying a curved surface abrading lap, an arm overhanging the lap, a lens carrier spindle carried by the overhanging portion of the arm with one of its ends opposed to the lap surface, said lens carrier spindle being connected to the lap spindle to be rotatable therewith at the same speed and in the same direction, a support for the arm, means for constraining the lens carrier spindle to cause it when moved laterally to traverse the surface of the lap, an adjustment for tilting the lens carrier spindle in the plane of its traversal to set its axis normal to an eccentric element of the curvature of the lap surface lying in the path of the lens carrier spindle's traversal thereof, means for constraining the longitudinal movement of said lens carrier spindle to cause it to move axially in all of its settings whereby said lens carrier spindle may be normally incident upon any element of the curvature of the lap surface lying in the path of traversal of the lens carrier spindle to which element the axis of the spindle has been perpendicularly set, and means for applying the abrading pressure through the lens carrier spindle in the direction of its longitudinal axis.

3. A lens grinding machine comprising a support, an arm trunnioned in said support for vertical movement at its outer end and obliquely adjustable laterally about an axis perpendicular to the trunnion axis, a rotatable lens carrier spindle carried by the arm, and universal angle driving gearing on the arm adapted to rotate said spindle at any oblique or vertical adjustment of the arm.

4. A lens grinding machine comprising a frame having a lap spindle journaled therein, a vertical post on the frame, a support journaled on the post, a yoke having a pair of trunnions, attached to the support to be adjustable about an axis extending perpendicularly to the axis of the trunnions, an arm pivoted at one end on said trunnions to be movable at its free end toward and away from the abrading surface of the lap, and a lens carrier spindle mounted in the free end of the arm.

5. In a lens grinding machine, the combination with a frame, a lap receiving spindle rotatable therein, a post on the frame, a countershaft rotative in the post, a sleeve axially movable on said post, a yoke having a pair of trunnions, attached to the sleeve to be adjustable about an axis extending perpendicularly to the axis of the trunnions and the axis of the post, an arm pivoted at one end on the trunnions to be movable at its free end toward and away from the abrading surface of the lap, a lens carrier spindle rotatable in the free end of the arm, a clamping device on the sleeve, means for oscillating the sleeve through the clamping device for laterally oscillating the arm and the lens carrier, and a universal angle driving gearing on the arm actuated by said countershaft for rotating the lens carrier at any oblique or vertical adjustment of the arm.

6. In a lens grinding machine, the combination with a supporting arm and a longitudinally adjustable rotatable lens carrier spindle in the arm, of a vertically immovable thrust bearing rotatably mounted on the arm, and a clamping device held to said thrust bearing and adapted to lock the spindle to said thrust bearing in various adjusted positions relatively to the arm while permitting rotation together of the thrust bearing, the clamp and the spindle.

7. In a lens grinding machine, the combination with a supporting arm, and a longitudinally adjustable lens carrier spindle rotatable in the arm, of a vertically immovable thrust bearing comprising shouldered collars rotatable upon shouldered portions of the arm, and a clamping device held to said thrust bearing and adapted to lock the spindle to said thrust bearing in various adjusted positions relatively to the arm while permitting rotation together of the thrust bearing, the clamp and the spindle.

8. In a lens grinding machine, the combination with a supporting arm and a lens carrier spindle longitudinally adjustable in the arm, of a loosely fitting thrust collar surrounding the spindle, a clamp plate pivotally attached at one end to said thrust collar and having an opening embracing the spindle, which opening is adapted when lying in a plane substantially perpendicular to the longitudinal axis of the spindle to permit the free passage of the spindle therethrough and which when tilted relatively to the spindle grips the sides of the spindle, means normally tilting the clamp plate whereby the thrust collar is adjustably locked to the spindle, and a plurality of opposed bearing surfaces on the thrust collar and the adjacent portion of the arm coöperating to hold the thrust collar axially immovable relatively thereto.

9. In a lens grinding machine, the combination with an abrading lap, a lens carrier spindle and an arm carrying said spindle at one end and pivoted at the other end to permit of the lens carrier being moved toward and away from the abrading lap, of an abutment stationary in the plane of movement of the arm toward and away from the lap, a second abutment mounted on the free end of the arm, and a laterally constrained expansible spring interposed between the two abutments and exerting a thrust therebetween to urge the lens carrier spindle toward the abrading lap.

10. In a lens grinding machine, the combination with an abrading lap and a lens carrier arm fulcrumed intermediate its ends about a pivotal axis so as to be movable at its front end toward and away from the grinding lap, of a rocking lever fulcrumed intermediate its ends about a pivotal axis fixed relatively to and spaced laterally from the pivotal axis of the arm, and a spring interposed between the front of the lens carrier arm and that end of the rocking lever opposite the end coacting with the lens carrier arm to exert a thrust between them, the rear end of the lens carrier arm being adapted to coact with the adjacent end of the rocking lever to resist the movement of the lever by the spring, and said adjacent end of the rocking lever being adapted to yieldingly coact under pressure of the spring with the adjacent rear end of the arm to hold the front end of the arm elevated while permitting the free pivotal movement of the arm when it is lowered.

11. In a lens grinding machine, the combination with an abrading lap and a lens carrier arm fulcrumed intermediate its ends about a pivotal axis so as to be movable at its front end toward and away from the grinding lap, of a rocking lever fulcrumed intermediate its ends about a pivotal axis fixed relatively to and spaced laterally from the pivotal axis of the arm, a link connecting the rear end of the lens carrier arm with that end of said lever that is situated on the same side of a plane passing through the fulcrum axes, an abutment for limiting the swinging movement of the link toward the lens carrier arm, and a laterally constrained spring interposed between the front end of the arm and the free end of the rocking lever and exerting a thrust between them.

12. In a grinding machine, the combination with a lap, an arm having a relatively long end adapted to overhang the lap, a support to which the arm is pivoted for vertical movement at its ends and a lens carrier spindle mounted in the forward end of the arm to be operatively related to the lap when the arm is in a lowered position and movable with the arm toward and from the lap, of a rocking lever fulcrumed intermediate its ends to the arm support, a toggle link connection between the end of the arm and the adjacent limb of the rocking lever, and a yielding extensible means interposed between the other limb of said lever and the longer end of the arm to urge the lens carrier spindle toward the lap when the arm is lowered and said spindle is in the vicinity of the lap, the rocking lever meanwhile being held immovable by the buckled toggle link connection; said lever, toggle connection and extensible means operating when the long end of the arm is raised and the link elements of the toggle are extended, to hold the lens carrier spindle elevated.

13. In a lens grinding machine, the combination with a support, an arm pivoted thereto for vertical movement at its outer end, a lens carrier spindle on said arm, and a lap opposite the spindle, of a lever fulcrumed to said support, a toggle link connection between one limb of said lever and the inner portion of the arm, a rod pivoted to the other limb of the lever, a screw coupled to the outer portion of the arm and having a yielding extensible connection with the lever connected rod, and a spring on the screw normally expanding the extensible rod and screw connection and adapted to hold the lens carrier spindle either toward or away from the lap.

14. In a lens grinding machine, the combination with a support, an arm pivoted thereto for vertical movement at its outer end, a lens carrier spindle on said arm, and a lap opposite the spindle, of a lever fulcrumed to said support, a toggle link connection between one limb of said lever and the inner portion of the arm, a rod pivoted to the other limb of the lever, a screw coupled to the outer portion of the arm and having a yielding extensible connection with the lever connected rod, a spring on the screw normally expanding the extensible rod and screw connection, and a collar adjustable on the screw to vary the tension of the spring.

15. In a lens grinding machine, the combination with a support, an arm obliquely adjustable laterally on said support, and also trunnioned for vertical movement at its outer end, a lens carrier spindle on the arm, and a lap opposite the spindle, of a lever fulcrumed to said support, a toggle link connection between one limb of said lever and the inner portion of the arm, and a yielding extensible means interposed between the other limb of said lever and the outer portion of the arm and automatically moving the arm to press a lens carrier on the spindle toward the lap and to hold said spindle away from the lap at any oblique or vertical adjustment of the arm and while the lever is locked by the toggle connection.

16. In a lens grinding machine, the combination with a grinding lap, a post arranged with its axis parallel to the axis of the grinding lap and having an external cylindrical bearing surface concentric with its axis and a countershaft journaled to be rotatable within the post, of one or more detachable and interchangeable lens carrier actuating and constraining mechanisms each having a cylindrical bore adapted to slip over the external bearing surface of the post to journal the support thereon, a pair of trunnions carried by the support and arranged on an axis perpendicular to but lying in the same plane as the axis of the bore in the support, an arm attached to the trunnions at one end and overhanging the lap at its other end, a lens carrier spindle journaled in the lap overhanging end of the arm, a countershaft extension in the trunnioned end of the arm having a pendent end extending toward the bore in the support, gearing whereby the lens carrier spindle may be driven by the countershaft extension, a universal angle driving connection between the pendent portion of the countershaft extension and the gearing arranged at the intersection of the support bore and trunnioned axes whereby the pendent portion of the countershaft extension may remain coaxial with said bore and in driving engagement with the lens carrier spindle when the arm is moved about its trunnions, means for automatically coupling the countershaft extension of one of the interchangeable mechanisms to the countershaft as the mechanism support is slipped over the post, and means for axially constraining the mechanism support upon the post while permitting its oscillation thereon.

17. The combination with a lap and a cylindrical post having an external bearing surface, of one or more detachable and interchangeable lens carrier actuating and constraining mechanisms each comprising a sleeve provided with a bore adapted to slip over and become journaled upon the external bearing surface of the post and having a trunnion bracket attached thereto, said trunnion bracket being provided with a pair of trunnions the axis of which is arranged in a plane passing through the axis of the sleeve bore, and being adjustable relatively to the sleeve about an axis simultaneously perpendicular to the trunnion axis and the axis of the sleeve and intersecting these axes at their mutual intersection, an arm having a portion adapted to be engaged by the trunnions and having a portion overhanging the lap, a lens carrier spindle carried by the lap overhanging portion of the arm and a thrust bearing element for axially constraining the sleeve while permitting its oscillation on the post.

18. The combination with a lap and a post, a sleeve surrounding the post and mechanism for oscillating the sleeve, of one or more detachable and interchangeable lens carrier actuating and constraining mechanisms each comprising a support provided with a sleeve adapted to slide over and be clamped to the post surrounding sleeve in various longitudinal positions thereon, an arm attached to the support at one end and overhanging the lap at its other end and a lens carrier spindle mounted in the lap overhanging end of the arm.

19. In a lens grinding machine, the combination with a support, of a hollow lens carrier spindle journaled in said support and having a taper at one end of its bore and an adjacent scale, a renewable lens carrier coupling having a tapering shank entering the tapered portion of the spindle bore and carrying an index coacting with said scale, and a rod fitted in the spindle bore and engaging the lens carrier coupling for drawing its tapered shank tightly into the tapered portion of the spindle bore after the coupling has been applied to or readjusted on the spindle.

LEON G. SIMPSON.